United States Patent [19]

Sagger

[11] Patent Number: 4,770,391
[45] Date of Patent: Sep. 13, 1988

[54] PLUG AND SOCKET VALVE ASSEMBLY

[76] Inventor: Michael J. Sagger, 9 Pennycroft, Herpenden, Herfordshire AL5 2PD, United Kingdom

[21] Appl. No.: 784,682
[22] PCT Filed: Jan. 30, 1985
[86] PCT No.: PCT/GB85/00047
 § 371 Date: Sep. 30, 1985
 § 102(e) Date: Sep. 30, 1985
[87] PCT Pub. No.: WO85/03337
 PCT Pub. Date: Aug. 1, 1985

[30] Foreign Application Priority Data
 Jan. 30, 1984 [GB] United Kingdom ................. 8402353

[51] Int. Cl.⁴ ............................................. F16L 37/28
[52] U.S. Cl. ................................ 251/149.8; 251/149.5
[58] Field of Search ................ 251/149.1, 149.5, 149.8

[56] References Cited

U.S. PATENT DOCUMENTS

| | | | |
|---|---|---|---|
| 2,044,252 | 6/1936 | Mitchell et al. | 251/149.5 |
| 2,248,701 | 7/1947 | Fowler | 251/149.6 |
| 2,730,382 | 1/1956 | De Mastri | 285/97.3 |
| 3,514,129 | 5/1970 | Holdren | 285/62 |
| 3,565,078 | 2/1971 | Vailliancourt | 251/149.1 |
| 3,620,500 | 11/1971 | Santomieri | 251/149.1 |
| 3,768,501 | 10/1973 | Elson et al. | 251/149.1 |
| 4,167,204 | 9/1979 | Zeyra | 251/149.1 |

FOREIGN PATENT DOCUMENTS

| | | |
|---|---|---|
| 453662 | 1/1944 | Belgium . |
| 2334906 | 7/1977 | France . |
| 1363471 | 8/1974 | United Kingdom . |

Primary Examiner—A. Michael Chambers
Attorney, Agent, or Firm—Banner, Birch, McKie & Beckett

[57] ABSTRACT

A plug and socket value assembly including three main components is disclosed. The valve assembly includes a body or insert having an inlet and outlet, a closure element having a resilient seal which isolates the inlet from the outlet, and a connector plug having a fluid passageway which, when inserted into the body, displaces the closure element and opens the valve to allow fluid flow. The seal comprises a resiliently deformable end part which is urged against the body. This forces the body into the casing opening of the article in which the valve assembly is disposed and firmly secures the valve assembly in the casing.

12 Claims, 3 Drawing Sheets

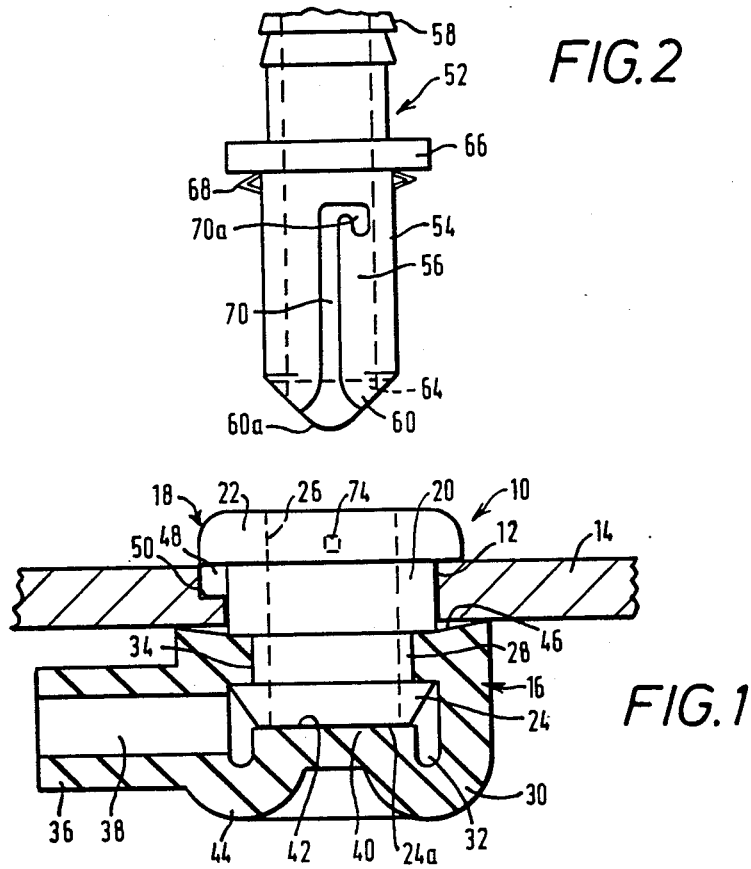
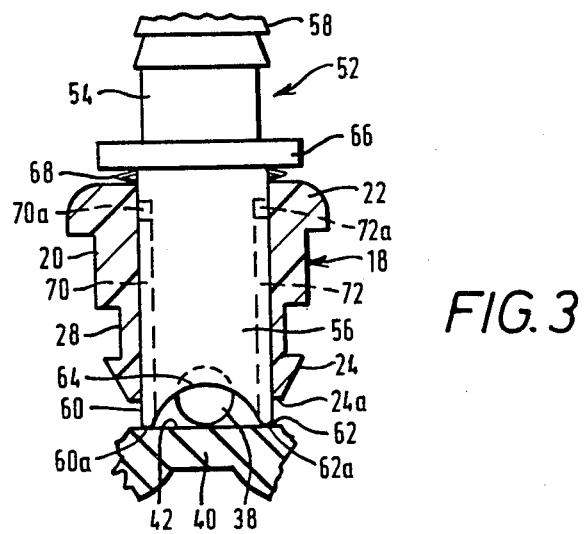

PLUG AND SOCKET VALVE ASSEMBLY

TECHNICAL FIELD

The invention relates to a plug and socket valve assembly comprising a valve body which automatically is opened and closed by insertion and withdrawal, respectively, of a mating connector plug.

The valve assembly is particularly useful in providing the means of attachment for one end of a pneumatic supply hose on a casing which houses a pump and control apparatus in a system for intermittent compression therapy in which the other end of the hose is connected to an inflatable garment.

BACKGROUND ART

In a known pneumatic pump for use in intermittent compression therapy a number of outlet sockets are provided for attachment of supply hoses. When a supply hose is disconnected from an outlet socket during operation of the pump it is necessary to seal the socket in order to maintain the efficiency of air supply to other outlet sockets. Sealing in the known construction is achieved by a simple plug or cap which is inserted into or over the outlet socket to stop egress of air.

DISCLOSURE OF THE INVENTION

The invention provides a plug and socket valve assembly comprising a valve body having an inlet and an outlet, which are isolated from one another by a resilient seal when the valve is closed characterised by a connector plug having a fluid passageway therethrough and which is adapted for insertion into the outlet of the valve body and constructed so as to displace the resilient seal when inserted into the valve body and thereby automatically open communication between said inlet and said fluid passageway whereby fluid can flow through said valve body and said connector plug.

BRIEF DESCRIPTION OF THE DRAWINGS

Two embodiments of a valve assembly according to the invention will now be described, by way of example, with reference to the accompanying drawings, in which:

FIG. 1 is a cross-sectional view through the valve body of a first assembly;

FIG. 2 is a side view of a connector plug of the first assembly;

FIG. 3 is a partial cross-sectional view through the first assembly with the connector plug inserted in the valve body;

BEST MODE FOR CARRYING OUT THE INVENTION

Figure 5:
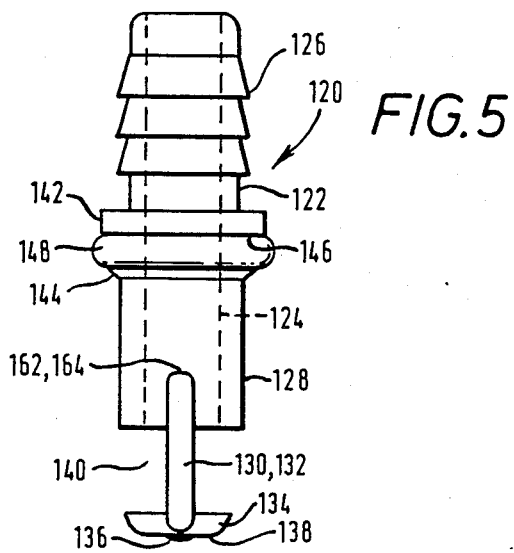
FIG. 5 is a side view of a connector plug of the second assembly.

Referring first to FIG. 1 of the drawings, there is shown a valve body 10 mounted in an aperture 12 provided in the wall 14 of a casing. The valve body comprises two parts; a closure element 16 and an insert 18. The insert comprises a cylindrical stem 20 having an enlarged head 22 at one of its ends and a frustoconical flange 24 at its opposite end. A central bore 26 passes through the insert. The stem has a reduced diameter portion 28 intermediate the head 22 and flange 24. The closure element 16 includes a cap 30 incorporating a valve cavity 32 into which the stem of the insert is received so that a radially inwardly directed flange 34 within the cavity of the closure element 16 grips around the reduced diameter portion 28 of the insert stem thereby connecting together the insert and the closure element and providing a fluid-tight seal therebetween. A connector nozzle 36 integral with cap 30 is provided with a central bore 38 which communicates with the valve cavity 32.

A raised circular platform 40 is formed in the base of the cavity the top surface 42 of which provides the seat which seals against the mouth 24a of the insert stem to isolate the insert bore 26 from the nozzle bore 38 when the valve is closed. To this end, the closure element 16 is formed from a resilient material and the cap 30 is formed with an annular rib 44 so that platform 40 can be resiliently displaced away from the mouth 24a to open the valve whereby bore 38 communicates with bore 26.

In order to create a fluid tight seal between the cap 30 and the casing wall 14 the annular end face 46 of the cap is radially inwardly dished. The closure element 16 is able to rotate 360° relative to insert 18 so as to bring the nozzle 36 into a number of desired positions relative to the casing wall. In order to prevent rotation of the insert relative to the casing wall a key 48 is located within a recess 50 provided in the casing wall.

Referring now to FIGS. 2 and 3 there is shown a connector plug 52 adapted to mate with the insert 18 and automatically open the valve.

The connector plug comprises a hollow stem 54 having through bore 56. One end of the stem is fluted at 58 to receive a supply hose (not shown) so that the hose is sealed to the stem. The opposite end of the stem is scalloped at diametrically opposed locations and is shaped to provide deltoid flanks 60,62 which terminate in tips 60a,62a respectively. Thus, an arcuate tunnel 64 is provided between the deltoid flanks which communicates with through bore 56. The stem is provided with an annular flange 66 intermediate its ends, and a resilient washer 68 abuts the underface of flange 66. Elongate keyways 70 and 72, respectively, are formed in the stem at diametrically opposed locations and each keyway extends to form the associated tip of the stem and terminates in a curved end part 70a, 72a, respectively, adjacent flange 66.

The stem of the connector plug below flange 66 is adapted to be received in the bore 26 of insert 18 as a push and twist fitting. Thus, diametrically opposed lugs as at 74 (FIG. 1) locate in respective ones of the keyways to lock together the connector plug and insert.

When the connector plug is fully inserted into the insert as shown in FIG. 3, the radiused tips engage, and downwardly flex, the platform 40 thereby unseating the sealing surface 42 from the mouth 24a of flange 24. Hence, cavity 32 is opened so that pressure fluid may pass from bore 38, through cavity 32 and tunnel 64 and pass out through bore 56. Preferably, the keyways are positioned such that when the connector plug is pushed and twisted home, the arcuate tunnel 64 is aligned with bore 38. When plug 52 is fully inserted the resilient washer 68 is compressed to provide a fluid tight seal between flange 66 and the head 22 of the insert. The washer 68 also provides a spring loaded fitment between the plug and insert. In order to disconnect these components the plug is first depressed somewhat against the restoring force of washer 68 and twisted and pulled so that the keys 74 are released and slide relative to their respective keyways. As the radiused tips of the stem move upwardly, the platform 40 returns to its unstrained position and reseats to seal the end of bore 26 at mouth 24a thereby automatically closing the valve.

It is envisaged that the valve body 10 may comprise only a single component that is, the insert 18 may be integral with the closure element 16, except of course, at the valve seat itself. Also, it is to be understood that the bayonet type connection provided by the keys 74 and keyways 70 and 72 may be omitted or some other suitable locking arrangement substituted therefor.

Figure 4:
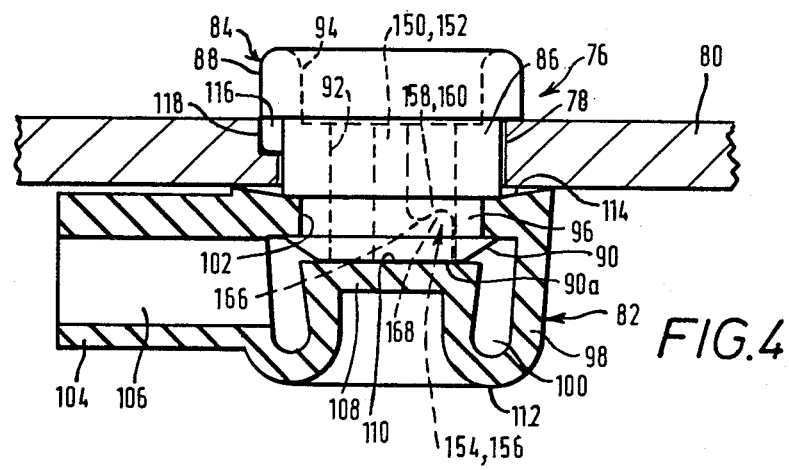
FIG. 4 is a cross-sectional view through the valve body of a second assembly.
Figure 6:
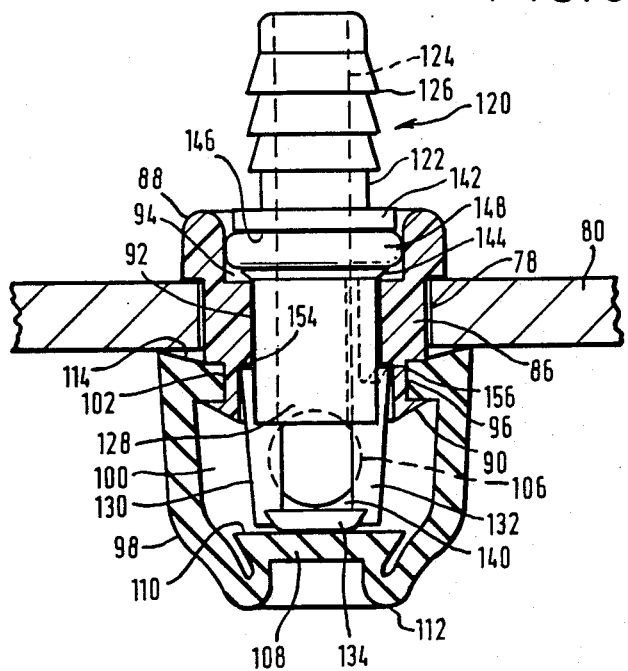
FIG. 6 is a partial cross-sectional view through the second assembly with the connector plug inserted in the valve body.

FIGS. 4 to 6 illustrate a preferred embodiment of the invention in which FIG. 4 shows a valve body 76 mounted in an aperture 78 provided in the wall 80 of a casing. The valve body comprises two parts; a closure element 82 and an insert 84.

The insert comprises a cylindrical stem 86 having an enlarged head 88 at one of its ends and a frusto-conical flange 90 at its opposite end. A central bore 92 passes through the insert and has an enlarged diameter portion 94 within the head 88. The stem has a reduced diameter portion 96 intermediate the head 88 and the flange 90.

The closure element 82 includes a cap 98 incorporating a valve cavity 100 into which the stem of the insert is received. A radially inwardly directed annular flange 102 at the mouth of the cavity grips around the reduced diameter portion 96 of the insert stem thereby connecting together the insert and the closure element and providing a fluid-tight seal therebetween. A connector nozzle 104 is integral with the cap 30 and is provided with a central bore 106 which communicates with the valve cavity 100.

An integral tapered cylindrical platform is upstanding from the base of the cavity, the top surface 110 of which provides the seat which seals against the mouth 90a of the insert stem to isolate the insert bore 92 from the nozzle bore 106 when the valve is closed. To this end, the closure element 82 is formed from a resilient material, such as rubber and the cap 98 thereof is formed to provide a flexible annular rib 112 so that top surface 110 of the platform 108 can be resiliently displaced away from the mouth 90a in the manner of a diaphragm to open the valve whereby bore 106 communicates with bore 92.

In order to create a fluidtight seal between the closure element 82 and the casing wall 80, the annular end face 114 of the cap 98 is radially inwardly dished.

The closure element 82 is able to rotate 360° relative to insert 84 so as to bring the nozzle 104 into a number of selective positions relative to the casing wall. In order to prevent rotation of the insert relative to the casing wall, a key 116 provided by the insert is located within a recess 118 provided in the casing wall.

Referring now to FIGS. 5 and 6, there is shown a connector plug 120 adapted to mate with the insert 84 and automatically open the valve.

The connector plug 120 comprises a hollow stem 122 having a through bore 124. One end of the stem is fluted by tapered ribbing 126 to receive a suitably sized supply hose (not shown) so that the hose is sealed to the stem. The opposite end 128 of the stem is smooth-walled and sized for insertion into bore 92 of the insert 84. A pair of integral legs 130, 132, respectively, depend from diametrically opposed locations at the open mouth of plug end 128. A bridging nose disc 134 interconnects the free ends of the legs and carries a projecting tip 136 on its outward facing surface 138. Thus the legs space the nose disc from the open mouth of plug end 128 so that, in use, fluid can flow through the space 140 and thence through the connector plug via the bore 124.

Intermediate the ends of the connector plug, a pair of spaced annular flanges 142,144 respectively, define a groove 146 which receives a resilient 'o'-ring 148.

Referring now to FIGS. 4 and 6 of the drawings, the connector plug end 128 below flange 144 is adapted to be received in the bore 92 of insert 84 as a push-and-twist fitting. To this end, the insert bore is formed with diametrically opposed axial keyways 150, 152 each slidingly to receive a respective one of the connector plug legs 130,132. The end of each axial keyway remote from head 88 is shaped to provide a circumferential rebate 154,156 including a downward facing stepped lip 158,160.

When the connector plug 120 is inserted into the insert, as shown in FIG. 6, the legs 130,132 slide along the axial keyways until, at full insertion, shoulders 162,164 on the legs clear the projecting part 166 of each stepped lip. The connector plug is then rotated about its axis to bring the shoulders 162,164 to abut within a recessed part 168 of each stepped lip. During this push-and-twist fitment of the connector plug, the disc nose 134 engages, and downwardly flexes, the platform 108 thereby unseating the sealing surface 110 from the mouth 90a of flange 90. Hence, cavity 100 is opened so that pressure fluid may pass from bore 106, through cavity 100; space 140 and pass out through bore 124. The tip 136 on disc nose 134 is provided in order to lessen the frictional force between the disc nose 134 and platform surface 110 during relative rotation therebetween. Preferably, the axial keyways 150, 152 are positioned such that when the connector plug is pushed and twisted home, the space 140 between the legs 130, 132 is aligned with the bore 106. When connector plug 120 is fully inserted the resilient 'o'-ring 148 is compressed to provide a fluidtight seal within the bore 94 of the connector plug head 88 and remains somewhat compressed when the shoulders 162,164 of the legs are located in the recessed part 168 of the stepped lips. The 'o'-ring 148 thus provides a spring-loaded fitment between the connector plug and insert.

In order to disconnect these components, the connector plug is first depressed somewhat against the restoring force of 'o'-ring 148, so that the shoulders 162,164 of the legs 130, 132 move downward out of the recessed part 168 of the stepped lips and are able to clear the projection 166 of each stepped lip, and then twisted and pulled so that the legs are released and slide up their respective axial keyways 150,152. As the disc nose 134 moves upwardly and out of engagement with the platform the platform returns to its unstrained position and reseats to seal the end of bore 92 at mouth 90a thereby automatically closing the valve.

In use of either assembly, connecting tubing is fitted to the nozzle of the closure element to provide a fluid connection to a source of pressurized fluid such as a pneumatic pump. Likewise, supply hose is fitted to the fluted portion of the connector plug which leads to an inflatable garment. Hence, the garment may be inflated when the connector plug is inserted into the valve body thereby opening the valve. In intermittent compression therapy the garment is subjected to cyclic inflation and deflation.

When it is required to disconnect the garment the connector plug is withdrawn thus automatically shutting off the pressurized fluid supply. The valve assembly according to the invention is particularly advantageous since there normally is a plurality of fluid outlets from the casing which houses the intermittent compression apparatus and which simultaneously are in use. With the valve arrangement according to the present invention one or more outlets automatically can be closed simply by disconnecting the relevant inflatable garment without the necessity of providing separate closure devices. Also, the device prevents inadvertent disconnection of the fluid supply which would exhaust the pressure fluid and thereby terminate or substantially reduce the effectiveness of the therapy.

I claim:

1. A plug and socket valve assembly comprising a valve body (10, 76) having an inlet (38, 106) and an outlet (26, 92) which are isolated from one another by a resilient seal (40, 108) when the valve is closed, a connector plug (52, 120) having a fluid passageway (56, 124) therethrough, said connector plug being adapted for insertion into said outlet of said valve body and constructed to displace the resilient seal when inserted into said valve body and thereby automatically open communication between said inlet and said fluid passageway so fluid can flow through said valve body and said connector plug, said resilient seal being disposed within a cavity (32, 100) defined within a resiliently deformable end part of said valve body intermediate said inlet and said outlet and includes a sealing surface (42, 110) which automatically seals said outlet when said connector plug is removed from said outlet, said resiliently deformable end part and said inlet of said valve body being formed of an integral, single piece of material, said valve body having a relatively rigid portion (18, 84) formed as an insert having a through bore (26, 92) detachably received in said resiliently deformable end part so that said through bore provides said outlet passageway of said valve body and has one end disposed within said cavity, said one end being sealed by said sealing surface in the absence of said connector plug, said insert being received in said resiliently deformable end part adjacent said one end of said insert, that part of said insert which is external of said resiliently deformable end part including a stem (20, 86) terminating in an enlarged head (22, 88) and said resiliently deformable end part including a flange (46, 114) surrounding said stem adjacent said one end of said insert, the valve body being attachable in an aperture of a mounting panel (14, 80) by connecting said insert to said resiliently deformable end part so that said mounting panel is located between said enlarged head and said flange.

2. An assembly according to claim 1, further characterized in that said inlet passageway is provided by a nozzle (36, 104) integral with said end part and having a bore (38, 106) communicating with said cavity.

3. An assembly according to claim 1 or 2, further characterised in that said connector plug and said valve body are provided with cooperating locking means (70,72,74;130,132,150,152) adapted to maintain said connector plug secured in said outlet, said locking means being engaged by a push and twist insertion of said connector plug relative to said valve body.

4. An assembly according to claim 1, further characterized in that said connector plug includes a hollow stem (54, 122) defining said passageway, said stem having a portion adapted to be inserted into said through bore of said insert and a portion adapted to receive a supply hose, said insertion portion having an actuating end part (60, 62; 130, 132) for engagement with said sealing surface (42, 110) to displace said sealing surface away from the mouth of said one end of said insert through bore when said insertion portion of said connector plug is fully inserted into said insert through bore, said actuating end part being constructed so as to provide a space (64, 140) between said sealing surface (42, 110) and said fluid passageway when the sealing surface has been displaced to communicate between said inlet and said fluid passageway.

5. An assembly according to claim 4, further characterized in that said actuating end part comprises a pair of spaced legs (130, 132) connected together by a bridging element (134) remote from said fluid passageway, said legs being adapted to cooperate with locking means (150, 152, 154, 156) provided by said insert to maintain said connector plug inserted in said insert.

6. A plug and socket valve assembly comprising a valve body (10, 76) having a relatively rigid portion (18, 84) formed with a through bore (20, 92) adapted to receive a mating connecting plug and a resiliently deformable cap (16, 82) which covers one end (24, 90) of said relatively rigid portion and defines a cavity (32, 100) in which a displaceable internal surface (42, 110) is disposed, said displaceable internal surface normally automatically sealing against the mouth (24a, 90a) of said one end, said displaceable internal surface and said resiliently deformable cap being formed of an integral single piece of material, said resiliently deformable cap including an inlet passageway (38, 106) which communicates with an outlet passageway (56, 124) provided in said mating connector plug (52, 120) when said plug is inserted into said through bore of said first portion to displace said displaceable internal surface resiliently away from said mouth.

7. An assembly according to claim 6, further characterized in that said relatively rigid portion (18, 84) is formed as an insert having a through bore (26, 92) detachably received in said resiliently deformable cap so that said through bore provides said outlet passageway of said valve body and has one end disposed within said cavity, said one end being sealed by said displaceable internal surface in the absence of said connector plug.

8. An assembly according to claim 7, further characterized in that said inlet passageway is provided by a nozzle (36, 104) integral with said resiliently deformable cap and having a bore (38, 106) communicating with said cavity.

9. An assembly according to claim 6, 7, or 8 further characterized in that said connector plug and said valve body are provided with cooperating locking means (70, 72, 74; 130, 132, 150, 152) adapted to maintain said connector plug secured in said outlet, said locking means being engaged by a push and twist insertion of said connector plug relative to said valve body.

10. An assembly according to claim 7, further characterized in that said connector plug includes a hollow stem (54, 122) defining said outlet passageway, said stem having a portion adapted to be inserted into said through bore of said relatively rigid portion and a portion adapted to receive a supply hose, said insertion portion having an actuating end part (60, 62; 130, 132) for engagement with said displaceable internal surface (42, 110) to displace said displaceable internal surface away from the mouth of said one end of said through bore when said insertion portion of said connector plug is fully inserted into said through bore, said actuating end part being constructed to provide a space (64, 140) between said displaceable internal surface (42, 110) and said outlet passageway when the displacement internal surface has been displaced to communicate between said inlet and said outlet passageway.

11. An assembly according to claim 10, further characterized in that said actuating end part comprises a pair spaced legs (130, 132) connected together by a bridging element (134) remote from said outlet passageway, said legs being adapted to cooperate with locking means (150, 152, 154, 156) provided by said relatively rigid portion to maintain said connector plug inserted in said relatively rigid portion.

12. An assembly according to claim 7, further characterized in that said insert is received in said resiliently deformable cap adjacent said one end of said insert, the part of said insert which is external of said resiliently deformable cap includes a stem (20, 86) terminating in an enlarged head (22, 88) and said resiliently deformable cap includes a flange (46, 114) surrounding said stem adjacent said one end of said insert, said valve body is attachable in an aperture of a mounting panel (14, 80) by connecting said insert to said resiliently deformable cap so that said mounting panel is located between said enlarged head and said flange.

* * * * *

UNITED STATES PATENT AND TRADEMARK OFFICE
CERTIFICATE OF CORRECTION

PATENT NO. : 4,770,391
DATED : September 13, 1988
INVENTOR(S) : Michael J. Saggers It is certified that error appears in the above-identified patent and that said Letters Patent is hereby corrected as shown below:

On the Title Page

The spelling of the inventor's last name should be corrected from "Sagger" to —Saggers—.

Signed and Sealed this

Seventh Day of February, 1989

*Attest:*

DONALD J. QUIGG

*Attesting Officer*  *Commissioner of Patents and Trademarks*